(12) United States Patent
Handshaw et al.

(10) Patent No.: US 10,521,630 B2
(45) Date of Patent: Dec. 31, 2019

(54) IMAGING READER FOR, AND METHOD OF, READING A TARGET BY IMAGE CAPTURE THROUGH A SEALED WINDOW INTEGRATED WITH AN OPTICAL SYSTEM

(71) Applicant: SYMBOL TECHNOLOGIES, LLC, Lincolnshire, IL (US)

(72) Inventors: Darran M. Handshaw, Sound Beach, NY (US); Edward D. Barkan, Miller Place, NY (US); Mark E. Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/075,388

(22) Filed: Mar. 21, 2016

(65) Prior Publication Data

US 2017/0270329 A1    Sep. 21, 2017

(51) Int. Cl.
*G06K 7/10*    (2006.01)
*G06K 7/14*    (2006.01)
*G06K 19/06*    (2006.01)

(52) U.S. Cl.
CPC ...... *G06K 7/10811* (2013.01); *G06K 7/10722* (2013.01); *G06K 7/10742* (2013.01); *G06K 7/10752* (2013.01); *G06K 7/10831* (2013.01); *G06K 7/10881* (2013.01); *G06K 7/1417* (2013.01); *G06K 19/06037* (2013.01)

(58) Field of Classification Search
CPC ....... G06K 7/10881; G06K 2207/1011; G06K 7/10851; G06K 7/10702; G06K 7/10722

USPC .............. 235/462.21, 462.2, 462.24, 462.43, 235/462.45
See application file for complete search history.

(56) References Cited

U.S. PATENT DOCUMENTS

| | | | |
|---|---|---|---|
| 6,612,493 B1 * | 9/2003 | DeGiovine | G06K 7/10881 235/462.01 |
| 8,770,485 B1 | 7/2014 | Liou | |
| 9,185,306 B1 | 11/2015 | Tan et al. | |
| 9,378,402 B2 * | 6/2016 | Duan | G06K 7/10831 |
| 2006/0131419 A1 | 6/2006 | Nunnink | |
| 2009/0272808 A1 | 11/2009 | Drzymala et al. | |
| 2009/0321614 A1 | 12/2009 | Drzymala | |
| 2010/0012726 A1 | 1/2010 | Tsi et al. | |
| 2012/0049049 A1 | 3/2012 | Vinogradov et al. | |
| 2012/0126015 A1 | 5/2012 | Wittenberg et al. | |
| 2015/0021396 A1 * | 1/2015 | Nunnink | G06K 7/10732 235/455 |

OTHER PUBLICATIONS

U.S. Appl. No. 15/094,260, filed Apr. 8, 2016.
International Search Report and Written Opinion for corresponding International Patent Application No. PCT/US2017/019678 dated May 19, 2017.
International Search Report and Written Opinion for International Patent Application No. PCT/US2017/022508 dated Jul. 19, 2017.

* cited by examiner

*Primary Examiner* — Karl D Frech
(74) *Attorney, Agent, or Firm* — Yuri Astvatsaturov

(57) ABSTRACT

A window environmentally seals an imaging reader operative for reading a target by image capture. An integrated optical system having one or more optical elements is formed of one-piece construction with the window for optically modifying an aiming light and/or an illuminating light passing through the optical elements.

19 Claims, 7 Drawing Sheets

IMAGING READER FOR, AND METHOD OF, READING A TARGET BY IMAGE CAPTURE THROUGH A SEALED WINDOW INTEGRATED WITH AN OPTICAL SYSTEM

BACKGROUND OF THE INVENTION

The present disclosure relates generally to an imaging reader for, and a method of, reading a target, such as a bar code symbol, to be electro-optically read by image capture over a field of view through a window that environmentally seals the imaging reader, and, more particularly, to an optical system having one or more optical elements that are integrated, and are of one-piece construction, with the window for optically modifying light, such as aiming and/or illuminating lights, that pass through the optical elements.

Solid-state imaging readers have long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded. A known imaging reader generally includes an aiming light system for directing one or more visible aiming lights through a window to a target to visually locate the target and, thus, advise an operator which way the reader is to be pointed in order to position the aiming lights on the target, prior to reading; an illuminating system for emitting one or more illuminating lights through the window toward the target to illuminate the target, especially in dimly lit environments; an imaging system for capturing an image of the target through the window over a field of view; and an object/target sensing system for activating the reader when the target enters the field of view. Each of these systems typically includes one or more optical elements. For example, the aiming light system may have one or more aiming lenses, and the illuminating system may have one or more illuminating reflectors.

Although generally satisfactory for their intended purpose, each such optical element is a discrete component that must be individually manufactured, sometimes being relatively expensive to fabricate, and be individually optically aligned when installed in the reader, thereby making them unsuitable for low cost, imaging readers. The installation of multiple optical elements can increase the tolerance build-up between components of the reader, thereby degrading the optical alignment. Moreover, light can reflect off surfaces of each such discrete optical element, for example, internally of the reader between the window and each such discrete optical element. Such internal light reflections can stray and migrate among the various systems, for example, to the imaging system, thereby degrading reading performance.

Accordingly, it would be desirable to reduce the number of components to be fabricated, installed, and optically aligned in the reader, to reduce the tolerance build-up between components of the reader, to simplify optical alignment, to mitigate stray internal reflections, and to improve overall reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
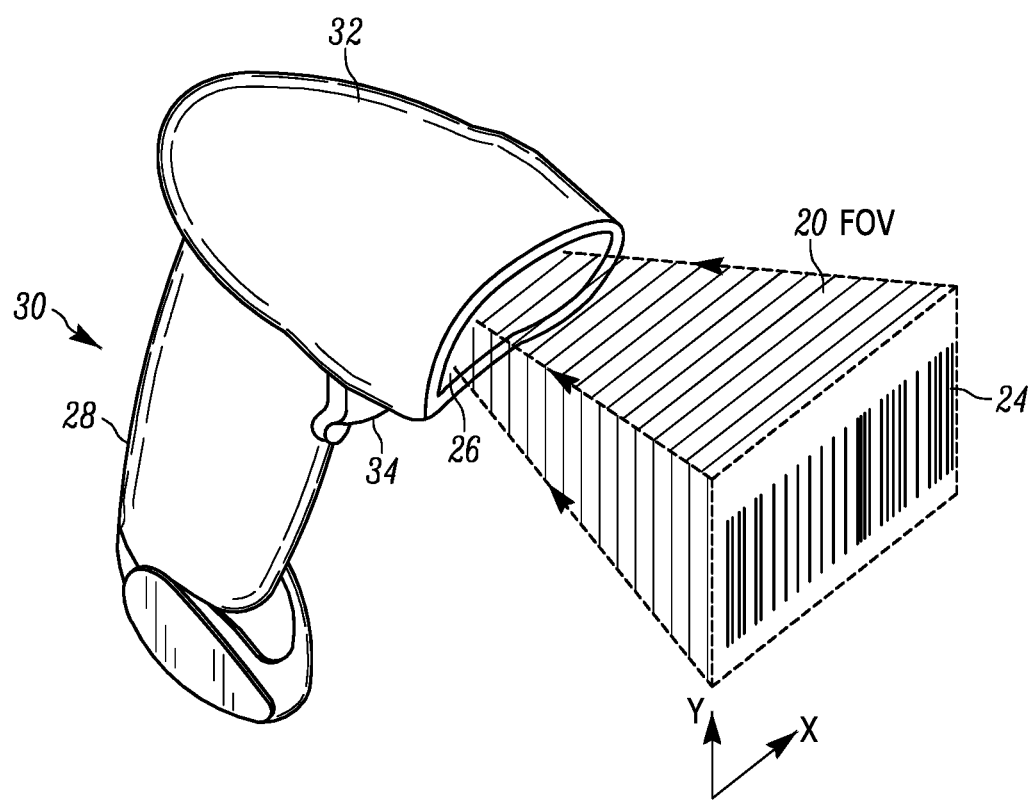
FIG. 1 is a perspective view of an exemplary embodiment of an electro-optical handheld reader for reading targets by image capture through a sealed window integrated with an optical system in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The window, reader and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging reader is operative for reading a target, e.g., a bar code symbol, by image capture. The reader includes a housing having an interior, and a light-transmissive window mounted on the housing for environmentally sealing the interior of the housing, for example, against moisture, dust, and like contaminants. An imaging system is mounted in the interior of the housing for capturing an image of the target through the window over a field of view. An optical system of one-piece construction is integrated with the window for optically modifying light passing through the integrated optical system. The window may be constituted of glass and/or plastic materials, and the integrated optical system includes one or more optical elements that may likewise be constituted of glass and/or plastic materials. Thus, the window may be made of glass and each optical element may be made of the same glass. Alternatively, the window may be made of plastic and each optical element may be made of the same plastic. In other variations, the window may be made of glass and each optical element may be made of plastic that is deposited or molded onto the glass in a process known as overmolding or replication, or vice versa, in which the window may be made of plastic and each optical element may be made of glass that is molded into the plastic.

If the reader includes an aiming system having one or more aiming light sources for emitting and directing one or more aiming lights through the window at the target, then the integrated optical system includes one or more optical elements, for example, aiming lenses, for configuring and focusing the aiming lights as the aiming lights pass through the aiming lenses. If the reader includes an illuminating system having one or more illuminating light sources for emitting and directing one or more illuminating lights through the window at the target, then the integrated optical system includes one or more optical elements, for example, illuminating reflectors, for configuring and reflecting the illuminating lights as the illuminating lights pass through the illuminating reflectors. If the reader includes both an aiming system and an illuminating system, then the integrated optical system may include both the aiming lenses and the illuminating reflectors.

Another feature of this disclosure resides in a window for environmentally sealing an imaging reader operative for reading a target by image capture. The window includes a light-transmissive pane having a zone through which an image of the target is captured over a field of view, and an integrated optical system of one-piece construction with the pane for optically modifying light passing through the integrated optical system. The integrated optical system may include a pair of aiming lenses located at opposite sides of, and away from, the zone for changing focal properties of aiming lights emitted by the reader, and/or a pair of illuminating reflectors, also located at opposite sides of, and away from, the zone for reflecting illuminating lights emitted by the reader. A plurality of locating pins integral with the pane are employed for mounting the window on the reader in an aligned, sealed relationship therewith.

In accordance with still another feature of this disclosure, a method of reading a target by image capture, is performed by environmentally sealing an interior of a housing of an imaging reader by mounting a light-transmissive window on the housing, by capturing an image of the target through the window over a field of view, and by integrating an optical system of one-piece construction with the window to optically modify light passing through the optical system.

By integrating the optical elements into the window, the number of components has been reduced, and therefore the need to fabricate, install, and align multiple components has been eliminated. Also, the tolerance build-up between the optical elements has been minimized. The aforementioned stray internal reflections have likewise been prevented from degrading reading performance.

Figure 2:
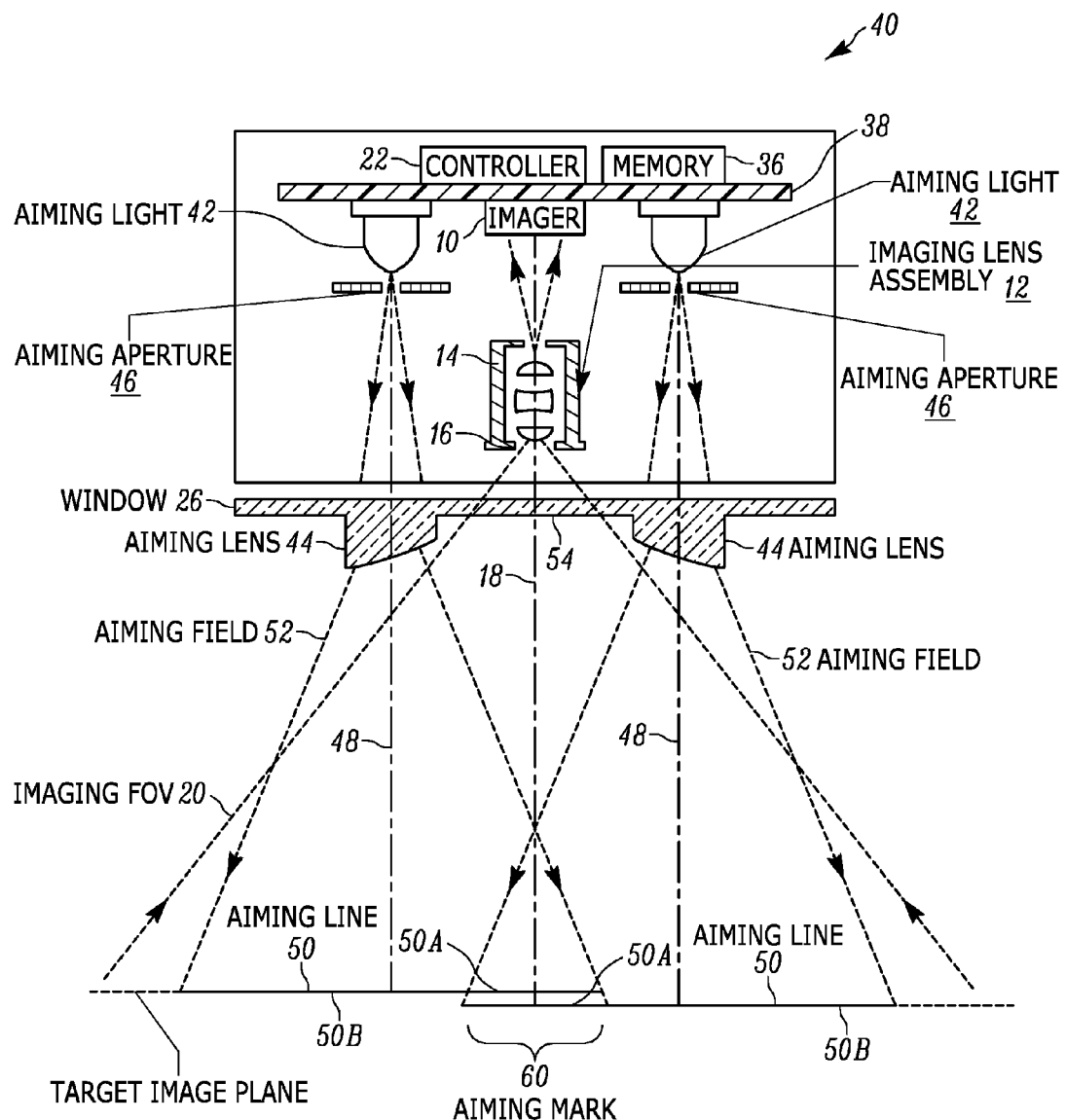
FIG. 2 is a diagrammatic view of components of imaging and aiming systems of the reader of FIG. 1.

Turning now to the drawings, reference numeral 30 in FIG. 1 generally identifies a handheld imaging reader for electro-optically reading targets 24, such as bar code symbols or like indicia, over an angular field of view (FOV) 20. The reader 30 includes a housing 32 in which an imaging or scan engine or module 40, as described in detail below in connection with FIG. 2, is mounted. The housing 32 includes a generally elongated handle or lower handgrip portion 28 and a barrel or upper body portion having a front end at which a light-transmissive window 26 is located. The cross-sectional dimensions and overall size of the handle 28 are such that the reader 30 can conveniently be held in an operator's hand. The body and handle portions may be constructed of a lightweight, resilient, shock-resistant, self-supporting material, such as a synthetic plastic material. The plastic housing 32 may be injection molded, but can also be vacuum-formed or blow-molded to form a thin hollow shell which bounds an interior space whose volume is sufficient to contain the various components of this reader 30. A manually actuatable trigger 34 is mounted in a moving relationship on the handle 28 in a forward facing region of the reader 30. An operator's forefinger is used to actuate the reader 30 to initiate reading by depressing the trigger 34. Although the housing 32 is illustrated as a portable, point-of-transaction, gun-shaped, handheld housing, this is merely exemplary, because the housing could also be embodied as a handheld, box-shaped housing, or with any other configuration including a hands-free configuration.

As best shown in FIG. 2, the imaging module 40 includes an imaging system having a solid-state imager 10, and an imaging lens assembly 12 mounted in a tubular holder 14 that has a circular aperture 16. The imager 10 is a two-dimensional, charge coupled device (CCD) array or a complementary metal oxide semiconductor (CMOS) array of cells or sensors having either a global or a rolling shutter. For low cost reasons, a CMOS imager may be advantageously used with a rolling shutter. The imager 10 and imaging lens 12 are preferably aligned along a centerline or an optical imaging axis 18 generally centrally located within the upper body portion of the housing 32.

In operation, the imaging system captures return light passing through an upper central zone 54 of the window 26 along the imaging axis 18 centered in the imaging field of view 20 of the imaging lens assembly 12 from the target 24 located in a range of working distances away from the window 26. The imager 10 is advantageously positioned closer to a rear wall of the upper body portion than to a front of the housing 32 in order to enlarge the imaging field of view 20 in the near range of working distances close to the reader 30. The imaging lens assembly 12 preferably comprises one or more fixed-focus lenses, preferably a Cooke triplet, having an imaging plane at which the target 24 is best focused and imaged onto the imager 10. The field of view 20 is generally rectangular and extends along the illustrated mutually orthogonal, horizontal X-axis and vertical Y-axis (see FIG. 1) that are both generally perpendicular to the imaging axis 18. The sensors produce electrical signals corresponding to a two-dimensional array of pixel information for an image of the target 24. The electrical signals are processed by a controller or programmed microprocessor 22 into data indicative of the target 24 being read. The controller 22 is connected to a memory 36 for data retrieval and storage. The controller 22 and the memory 36 are mounted on a printed circuit board 38, which need not be mounted in the module 40 as shown, but could be mounted remotely from the module 40.

The imaging system is capable of acquiring a full image of the target 24 under various lighting conditions. An illuminating system, as described below, may also be mounted on the module 40 to provide illuminating light to illuminate the target. Exposure time is controlled by the controller 22. Resolution of the array can be of various sizes although a VGA resolution of 640×480 pixels may be used to minimize cost.

An aiming system, including one or more aiming light assemblies, is supported on the module 40, and is offset from the imaging system. The aiming system is operative for projecting on the target 24 an aiming mark 60 (see FIG. 2). The aiming light assemblies are spaced apart along the horizontal X-axis at opposite sides of the imaging sensor 10. Each aiming light assembly includes an aiming light emitting diode (LED) 42, preferably, but not necessarily, mounted on the circuit board 38; a generally linear aiming aperture 46 that extends along the horizontal X-axis in front of the respective LED 42; and a toroidal aiming lens 44 mounted away from its respective LED 42 and, as more fully described below, is integrated with the window 26. Each aiming LED 42, aiming lens 44 and aiming aperture 46 are centered and lie along a respective aiming axis 48. The aiming axes 48 generally lie in a common plane and are generally parallel to one another. As shown, the aiming LEDs 42 and the sensor 10 are mounted along a common horizontal axis, but this need not be the case, since the aiming LEDs 42 can be mounted either above or below the imager 10. Advantageously, the imaging axis 18 lies in the same plane and is generally parallel to the aiming axes 48.

The aiming light assemblies are operative for directing the aiming light emitted from each aiming LED 42 through the respective aperture 46 and the respective aiming lens 44 along the respective aiming axis 48 over an angular aiming field 52 that is centered on the respective aiming axis 48 at the target 24. On the target 24, these aiming fields 52 describe a pair of aiming light lines 50, each having a predetermined brightness. The aiming light lines 50 are collinear along the horizontal X-axis. The aiming light lines 50 have inner linear end regions 50A that extend past the imaging axis 18 and that overlap on the target 24 to form a bright, linear, aiming mark 60 having a brightness greater than the predetermined brightness due to the superposition of the inner linear end regions 50A to visually indicate a center area of the field of view 20 over the range of working distances. Thus, the operator can position the aiming mark 60 on the target 24, and the target 24 will be substantially centered in the imaging field of view 20. The aiming light lines 50 also have outer linear end regions 50B that extend along the horizontal X-axis toward, and that visually indicate, approximate boundary zones or end limits of the field of view 20 over the range of working distances. Thus, the operator is guided to position the outer linear end regions 50B on the target 24, such that the target 24 will be substantially contained entirely within the imaging field of view 20.

Figure 3:
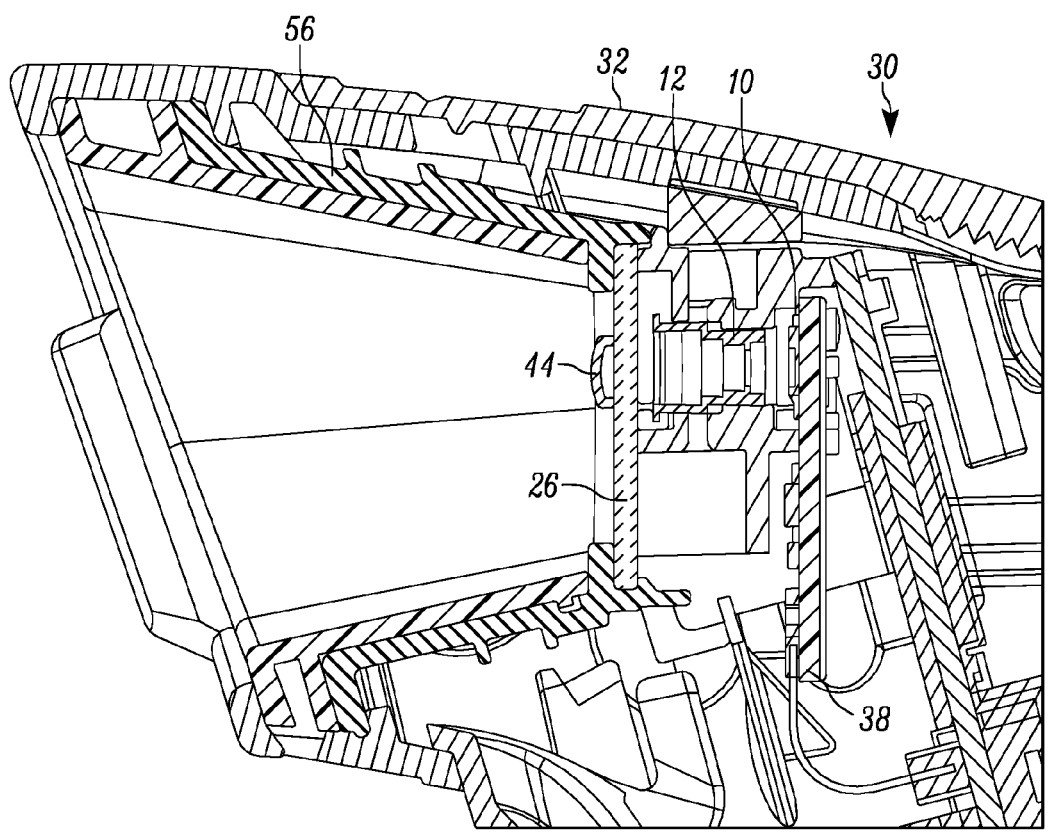
FIG. 3 is a broken-away, sectional view depicting the imaging and aiming systems of FIG. 2.
Figure 4:
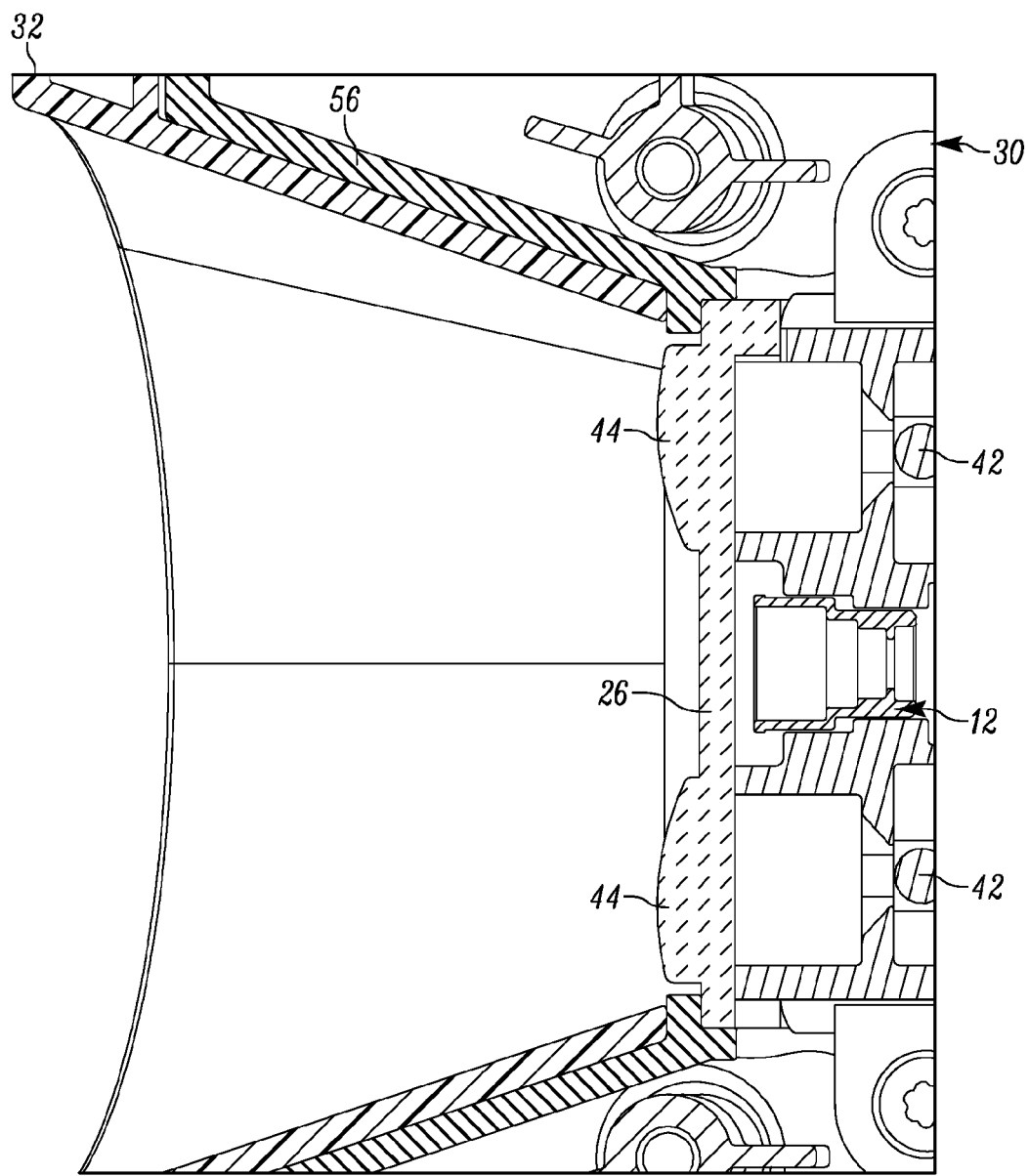
FIG. 4 is a broken-away, top view of the systems of FIG. 3.
Figure 5:
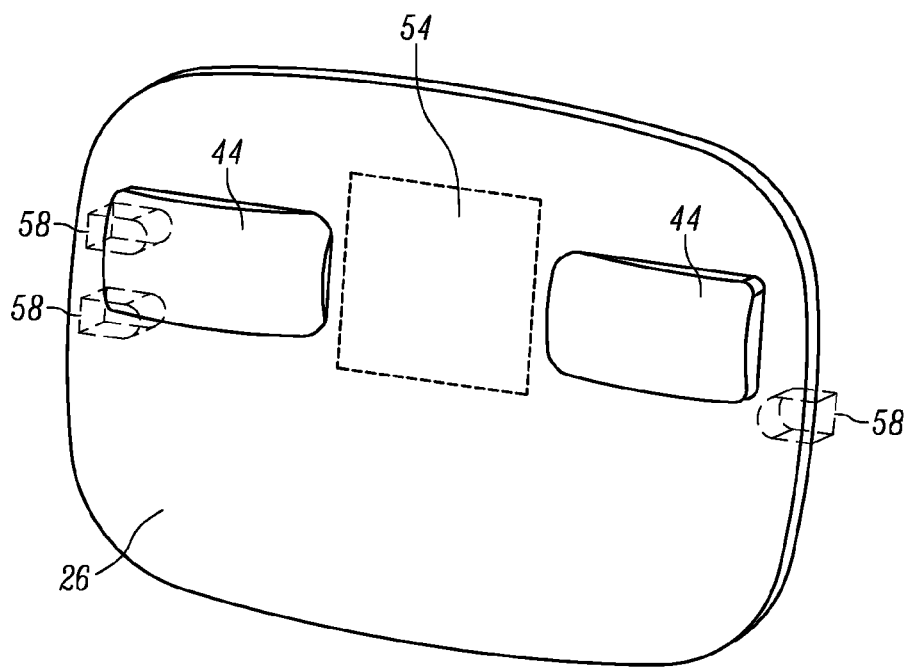
FIG. 5 is a front, perspective view of the window of FIGS. 2-4 in isolation in accordance with one embodiment.

As best seen in FIGS. 3-5, the aiming lenses 44 are formed of one-piece construction with the window 26 at opposite sides of, and away from, the upper central zone 54 through which the image of the target 24 is captured. The window 26 may be constituted of glass and/or molded plastic materials, and the integrated optical system includes one or more optical elements, e.g., aiming lenses 44, which may likewise be constituted of glass and/or molded plastic materials. Thus, the window 26 may be made of glass and each aiming lens 44 may be made of the same glass. Alternatively, the window 26 may be made of plastic and each aiming lens 44 may be made of the same plastic. In other variations, the window 26 may be made of glass and each aiming lens 44 may be made of plastic that is deposited or molded onto the glass in a process known as overmolding or replication, or vice versa, in which the window 26 may be made of plastic and each aiming lens 44 may be made of glass that is molded into the plastic. Although the aiming lenses 44 are shown on the outer surface of the window 26, they can also be formed on the inner surface of the window 26. Thus, the aiming lenses 44 are not formed as separate discrete components, as in the prior art, but instead are integral with the window 26, thereby reducing the total number of components to be individually fabricated, installed and aligned. Also, the tolerance build-up between the aiming lenses 44 and the other components of the aiming system has been minimized. The aforementioned stray internal reflections have likewise been prevented from degrading reading performance. The window 26 environmentally seals the interior of the housing 32, for example, against moisture, dust, and like contaminants. A rubber gasket or seal 56 helps to seal the window 26 in its position at the front of the reader 30. As best shown in FIG. 5, a plurality of locating pins 58 are integrally formed with the window 26 to assist in mounting the window 26 in its sealed position, and to prevent rotation of the window 26. One such pin 58 is provided at one side of the window 26, and a pair of such pins 58 is provided at the opposite side of the window 26. The locating pins 58 assist in locating the window 26 accurately with respect to the aiming and imaging systems. More particularly, the optical elements on the window 26 are accurately located relative to the aiming lenses 44, the aiming apertures 46, and the aiming LEDs 42.

Figure 7:
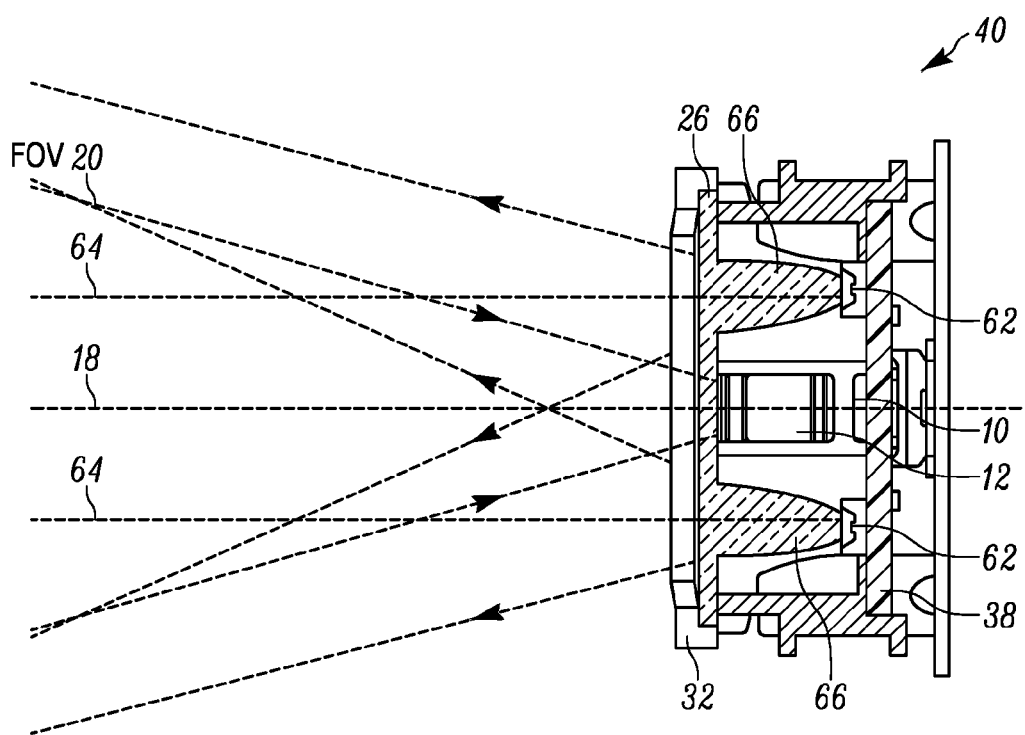
FIG. 7 is a top, sectional view of components of the imaging and illuminating systems of the reader of FIG. 1.
Figure 8:
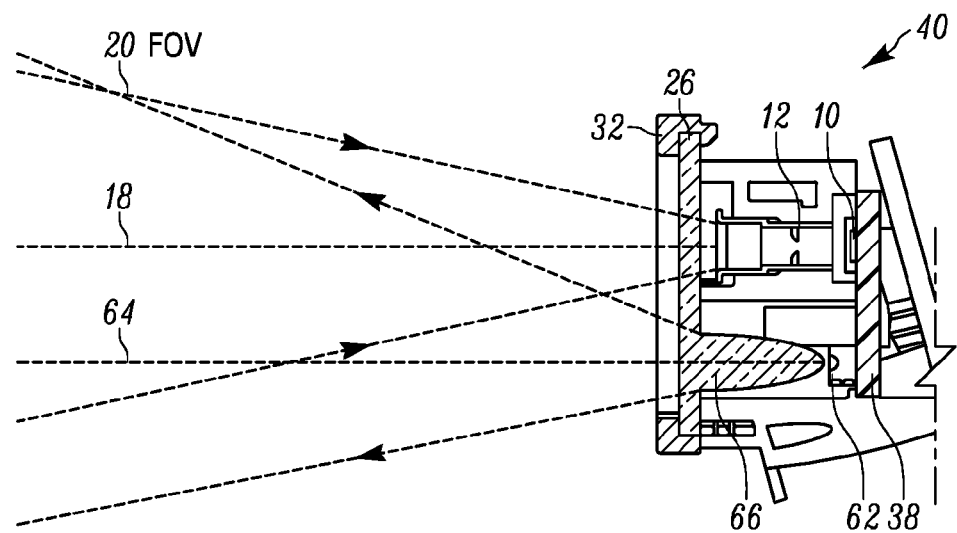
FIG. 8 is a side, sectional view of components of the imaging and illuminating systems of FIG. 7.

As schematically shown in FIGS. 7-8, as mentioned above, the reader 30 may also include an illuminating light system, e.g., one or more illuminating light sources, such as light emitting diodes (LEDs) 62, mounted in the imaging reader 30, for example, on the printed circuit board 38. Each illuminating LED 62 is operative for illuminating the target 24 by emitting illuminating light over an illumination angle centered on an illumination axis 64 toward the target 24 for reflection and scattering therefrom. Each illuminating LED 62 is advantageously provided with an optical element, such as a compound parabolic reflector (CPR) 66 to uniformly and efficiently illuminate the target 24 with an illuminating light pattern. Each CPR 66 is integrated with the window 26 and is configured to receive, and to optically modify, the illuminating light emitted from each illuminating LED 62 to generate a generally uniform and efficient illumination light pattern, preferably of generally rectangular shape, that is substantially congruent to, and substantially overlaps, the field of view 20, again preferably of generally rectangular shape, along both the X- and Y-axes depicted in FIG. 1. Each CPR 66 has a first pair of parabolic segments that are located at opposite sides of the illumination axis 64 for reflecting the emitted illuminating light over a first illumination angle along the X-axis, and a second pair of parabolic segments that are also located at opposite sides of the illuminating axis 64 for reflecting the emitted illuminating light over a second illumination angle along the Y-axis. Each CPR 66 is advantageously a solid element, e.g., a molded plastic, whose interior surfaces reflect and guide the illuminating light away from each illuminating LED 62 with total internal reflection. Each CPR 66 could also be a hollow element.

Figure 6:
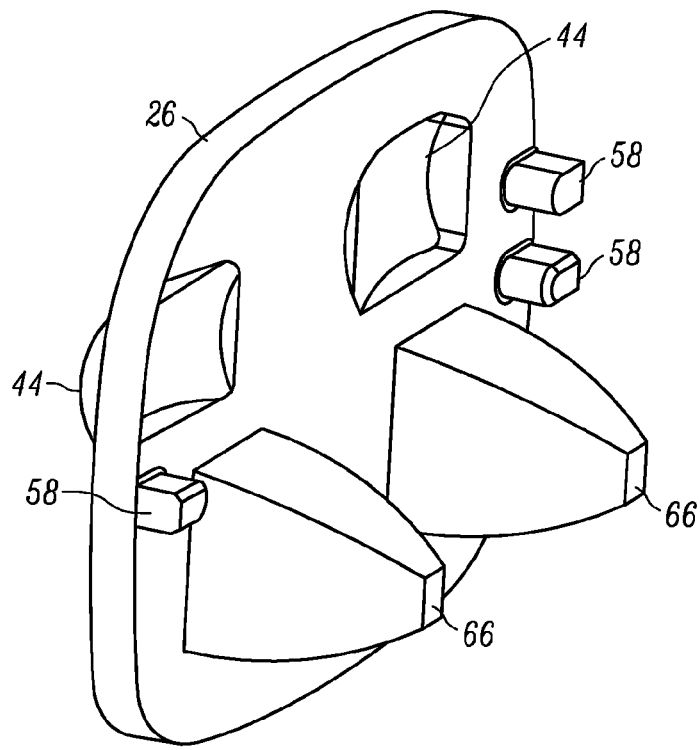
FIG. 6 is a rear, perspective view of another embodiment of the window in isolation.

As best seen in FIG. 6, the CPRs 66 are formed of one-piece construction with the window 26 at opposite sides of, and below, the upper central zone 54 through which the image of the target 24 is captured. The window 26 may be constituted of glass and/or molded plastic materials, and the integrated optical system includes one or more optical elements, e.g., the CPRs 66, that may likewise be constituted of glass and/or molded plastic materials. Thus, the window 26 may be made of glass and each CPR 66 may be made of the same glass.

Alternatively, the window 26 may be made of plastic and each CPR 66 may be made of the same plastic. In other variations, the window 26 may be made of glass and each CPR 66 may be made of plastic that is deposited or molded onto the glass in a process known as overmolding or replication, or vice versa, in which the window 26 may be made of plastic and each CPR 66 may be made of glass that is molded into the plastic. The aforementioned locating pins 58 insure that the optical elements on the window 26 and its CPRs 66 are accurately located relative to the illuminating LEDs 62. Although the CPRs 66 are shown on the inner surface of the window 26, they can also be formed on the outer surface of the window 26. Thus, the CPRs 66 are not formed as separate discrete components, as in the prior art, but instead are integral with the window 26, thereby reducing the total number of components to be individually fabricated, installed and aligned. Also, the tolerance build-up between the aiming lenses 44 and the other components of the aiming system has been minimized. The aforementioned stray internal reflections have likewise been prevented from degrading reading performance.

Figure 9:
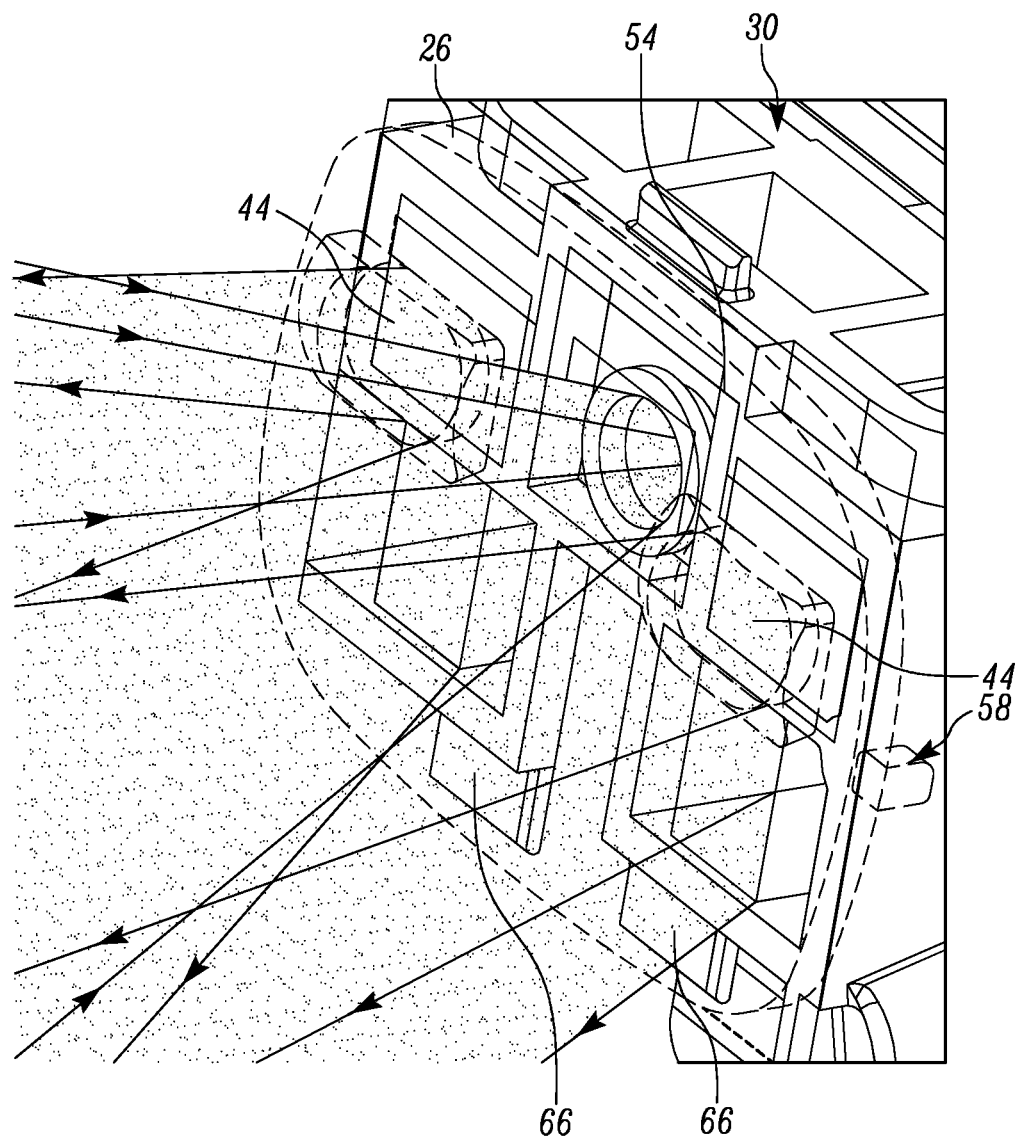
FIG. 9 is an enlarged, broken-away, perspective view depicting the aiming lights and the illuminating lights configured by the optical elements integrated with the window of the reader of FIG. 1.

As described above, one or more of the aiming lenses 44 and/or one or more of the CPRs 66 constitute optical elements that are part of an integrated optical system of one-piece construction with the window 26 for optically modifying light passing through the respective optical elements. FIG. 9 depicts how the aiming lenses 44 configure and focus the aiming lights to form aiming beams, as well as how the CPRs 66 configure and guide the illuminating lights to form illuminating beams.

In addition, optical elements from systems other than the aiming and illuminating systems can be incorporated into the window 26. For example, if the reader 30 has an object/target sensor system that employs a lens or other optical element for sensing when a target 24 has entered the field of view 20, then that lens can be integrated into the window 26 as well. Furthermore, one of the lenses from the imaging lens assembly 12 may, in certain cases, be integrated into the window 26. The optical elements of the aiming system need not be limited solely to the aiming lenses 44, and the optical elements of the illuminating light system need not be limited solely to the CPRs 66, because many other types of optical elements, such as different lenses, different reflectors or mirrors, filters, beam splitters, prisms, diffusers, gratings, holography plates, etc. could also be employed in each system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging reader for reading a target by image capture, the imaging reader comprising:
   a housing;
   a light-transmissive window mounted to the housing;
   a chassis mounted in the interior of the housing;
   an imaging system mounted in the interior of the housing and at least partially supported by the chassis, the imaging system including an imager and an imaging lens positioned between the imager and a zone of the light-transmissive window, the imaging lens having a first end proximal to the zone of the light-transmissive window, the first end having an inner diameter,
wherein a distance between the zone of the light-transmissive window and the first end of the imaging lens is less than the inner diameter of the first end of the imaging lens.

2. The imaging reader of claim 1, further comprising a lighting system mounted in the interior of the housing to emit light, the lighting system including an aiming light source and an aperture positioned between the aiming light source and the light-transmissive window, the aperture being a part of the chassis.

3. The imaging reader of claim 2, wherein the light-transmissive window includes an integrated optical element positioned in front of the aiming light source, and wherein light passing through the integrated optical element is modified differently than light passing through the zone of the light-transmissive window.

4. The imaging reader of claim 3, wherein the integrated optical element is an aiming lens having a generally rectangular shape with a first side proximal to the zone and a second side opposite the first side and distal to the zone, the first side extending a shorter distance away from an exterior wall of the light-transmissive window than the second side.

5. The imaging reader of claim 1, wherein the light-transmissive window and the chassis include a set of protrusions and a set of complementarly shaped surfaces configured to alight the light-transmissive window relative to the chassis.

6. The imaging reader of claim 1, further comprising:
a lighting system mounted in the interior of the housing to emit light, the lighting system including an illuminating light source; and
an optical element integrated with the light-transmissive window and positioned in front of the illuminating light source,
wherein the optical element is configured to modify light emitted by the illuminating light source to produce a generally uniform light pattern.

7. The imaging reader of claim 6, wherein the generally uniform light pattern has a generally rectangular shape.

8. The imaging reader of claim 6, wherein the optical element is a compound parabolic reflector that extends from an interior wall of the light-transmissive window toward the illuminating light source.

9. An imaging reader for reading a target by image capture, the imaging reader comprising:
a housing;
a light-transmissive window mounted to the housing;
a chassis mounted in the interior of the housing;
an imaging system mounted in the interior of the housing and at least partially supported by the chassis, the imaging system including an imager positioned behind a zone of the light-transmissive window; and
a lighting system mounted in the interior of the housing to emit light, the lighting system including an aiming light source and an aperture positioned between the aiming light source and the light-transmissive window, the aperture being a part of the chassis,
wherein the light-transmissive window includes an integrated optical element positioned in front of the aiming light source, and wherein light passing through the integrated optical element is modified differently than light passing through the zone of the light-transmissive window,
wherein the light-transmissive window and the chassis include a set of protrusions and a set of complementarly shaped surfaces configured to alight the light-transmissive window relative to the chassis.

10. The imaging reader of claim 9, wherein the integrated optical element is an aiming lens having a generally rectangular shape with a first side proximal to the zone and a second side opposite the first side and distal to the zone, the first side extending a shorter distance away from an exterior wall of the light-transmissive window than the second side.

11. The imaging reader of claim 9, wherein the lighting system further includes an illuminating light source, wherein the light-transmissive window further includes another integrated optical element positioned in front of the illuminating light source, and wherein the another integrated optical element is configured to modify light emitted by the illuminating light source to produce a generally uniform light pattern.

12. The imaging reader of claim 11, wherein the generally uniform light pattern has a generally rectangular shape.

13. The imaging reader of claim 11, wherein the another integrated optical element is a compound parabolic reflector that extends from an interior wall of the light-transmissive window toward the illuminating light source.

14. An imaging reader for reading a target by image capture, the imaging reader comprising:
a housing;
a light-transmissive window mounted to the housing;
a chassis mounted in the interior of the housing and abutting the light-transmissive window;
an imaging system mounted in the interior of the housing and at least partially supported by the chassis, the imaging system including an imager positioned behind a zone of the light-transmissive window; and
a lighting system having a light source mounted in the interior of the housing to emit light;
wherein the light-transmissive window includes an integrated optical element positioned in front of the light source, the integrated optical element being configured such that light passing through the integrated optical element is modified differently than light passing through the zone of the light-transmissive window, and
wherein the light-transmissive window and the chassis include a set of protrusions and a set of complementarly shaped surfaces configured to alight the light-transmissive window relative to the chassis.

15. The imaging reader of claim 14, wherein the lighting system includes an aiming light source and an aperture positioned between the aiming light source and the light-transmissive window, the aperture being a part of the chassis.

16. The imaging reader of claim 15, wherein the integrated optical element is an aiming lens having a generally rectangular shape with a first side proximal to the zone and a second side opposite the first side and distal to the zone, the first side extending a shorter distance away from an exterior wall of the light-transmissive window than the second side.

17. The imaging reader of claim 14, wherein the light source is an illuminating light source, wherein integrated optical element is positioned in front of the illuminating light source, and wherein the integrated optical element is configured to modify light emitted by the illuminating light source to produce a generally uniform light pattern.

18. An imaging reader for reading a target by image capture, the imaging reader comprising:
a housing;
a light-transmissive window mounted to the housing;
a chassis mounted in the interior of the housing;
an imaging system mounted in the interior of the housing and at least partially supported by the chassis, the imaging system including an imager positioned behind a zone of the light-transmissive window; and
a lighting system having a light source mounted in the interior of the housing to emit light;
wherein the light-transmissive window includes an integrated optical element positioned in front of the light source, the integrated optical element being configured to modify light emitted by the light source to produce a generally uniform light pattern,
wherein the light-transmissive window and the chassis include a set of protrusions and a set of complementarly shaped surfaces configured to alight the light-transmissive window relative to the chassis.

19. An imaging reader for reading a target by image capture, the imaging reader comprising:
a housing;
a light-transmissive window mounted to the housing and exposed to the exterior of the imaging reader;
a chassis mounted in the interior of the housing;
an imaging system mounted in the interior of the housing and at least partially supported by the chassis, the imaging system including an imager positioned behind a zone of the light-transmissive window; and
a lighting system having a first light source mounted in the interior of the housing to emit a first light and a second light source mounted in the interior of the housing to emit a second light,
wherein the light-transmissive window includes a first integrated optical element positioned in front of the first light source, the first integrated optical element being configured to alight the first light, and
wherein the light-transmissive window includes a second integrated optical element positioned in front of the second light source, the second integrated optical element being configured to produce a generally uniform light pattern.

* * * * *